Patented Apr. 28, 1953

2,636,873

UNITED STATES PATENT OFFICE 2,636,873

BLENDS OF POLYAMIDES AND POLYMERIC POLYAMINES

Boynton Graham, Claymont, Del., assignor to E. I. du Pont de Nemours & Company, Wilmington, Del., a corporation of Delaware No Drawing. Application August 13, 1949, Serial No. 110,229

11 Claims. (Cl. 260—45.5)

This invention relates to polyamides and more specifically to modified alpha-amino acid polyamide compositions of superior dyeability, tenacity, elongation, and/or thermal stability.

Homopolyamides and copolyamides of alpha-primary amino acids are generally highly resistant to acid direct and vat dyes and are only moderately dyed by acetate dyes. Alpha-amino acid copolyamides containing appreciable proportions of N-substituted substituents, i. e., alpha-secondary amino acid units, exhibit generally good dye receptivity. However, these polyamides are difficult to obtain in the desired high molecular weight ranges. Furthermore, as pointed out in the copending application of Robert Neal MacDonald and Richard Seyfarth Schreiber, Serial No. 110,024, filed August 12, 1949, it is necessary that a very careful balance be maintained in the relative proportions of alpha-primary and alpha-secondary amino acid units in the polyamides to insure both good dyeability and as good film and fiber properties as possible. In fact, those polyamides containing a preponderance of alpha-secondary amino acid units are generally too water sensitive for effective use as fibers—being in some instances water soluble. The dye receptivity of the alpha-primary amino acid polyamides can also be markedly improved, as pointed out in the copending application of MacDonald Serial No. 78,223, filed February 24, 1949, by after-treating them with amide-forming derivatives, e. g. the N-carboanhydrides of selected alpha-secondary amino acids without appreciably altering their desirable physical properties. However, such a procedure is less desirable from a commercial standpoint because of the further expense and extra equipment necessary for carrying out the after-treating step.

This invention has as an object the provision of new dyeable polyamide compositions. A further object is the provision of new polyamide fibers. Another object is the provision of new polyamide films. Other objects will appear hereinafter.

These objects are accomplished by the invention of compositions essentially comprising at least one alpha-primary monoaminomonocarboxylic acid polyamide of intrinsic viscosity [$\eta$] in a polar solvent equal to or greater than 0.4 and at least one polymeric polyamine, i. e., a polymeric material of molecular weight equal to or greater than 500 and preferably equal to or greater than 1000, having a plurality of amino groups, the polyamine portion of the composition constituting from 1 to 25% by weight of the total composition. These polymeric polyamide/polymeric polyamine compositions can be well and easily dyed with many classes of dyes and these blends retain to a major degree, and may even exhibit improvement over, the outstanding properties of the alpha-primary monoaminomonocarboxylic acid polyamides, e. g. good cold drawability, good resilience, good tensile strength, and high thermal stability. It is preferred because of better dye receptivity to use blends of alpha-primary monoaminomonocarboxylic acid polyamides with from 5 to 15% of the total composition being polymeric poly-primary amines. Blends containing less than 1% of the polymeric polyamines are not noticeably different from the unmodified polyamides and blends containing more than 25% of the polymeric polyamines are generally too weak to be of use in the film, fiber and plastic fields.

The blends of this invention can be conveniently prepared by dissolving the alpha-amino acid polyamide and the polyamine in a mutual solvent, e. g. strong organic or inorganic acids, phenols, aromatic hydrocarbons, and/or halogenated hydrocarbons and then evaporating the solvent, or forming the solution directly into the desired article, e. g. a film or filament. Of course, if a strong acid is used as the mutual solvent the polyamine will be converted to the corresponding amine salt and will so appear in the desired article; however by treating this with alkali the amine salt will be reconverted to the polyamine. Other methods known in the art for preparing blends or mixtures of organic polymers can also be used, for instance, sintering, fusing, simple mechanical mixing, best accomplished with efficient stirring, grinding or milling, or solution blending wherein each of the components of the blend are dissolved separately in a suitable solvent and the resulting solutions mixed.

The alpha-amino acid polyamide/polymeric polyamine blends of this invention can be dyed in the usual way using aqueous dye baths. However, for best results, i. e., for heaviest dye uptake, it is preferred to use aqueous dye baths that contain a small amount, e. g. from 0.1 to 3.0% of a carrier for the dye, i. e., a solvent or swelling agent for the alpha-amino acid polyamide, for example, phenols, aromatic hydrocarbons, and halogenated hydrocarbons.

The polymeric polyamines that can be used singly or in mixtures in preparing the compositions of this invention are many and varied. The invention is generic to the employment of polymeric polyamines of molecular weight of at least 500 and of neutral equivalent of not more than 1000, preferably of neutral equivalent of 200–600.

For instance, the polymeric poly-primary, poly-secondary, and/or poly-tertiary polyamines prepared by the reductive amination of the monoolefin/carbon monoxide polyketones with ammonia, and/or primary, or secondary amines, as is disclosed in the copending application of Hoehn, Serial No. 4,932, filed January 28, 1948, can be used. So also can deacetylated chitin; the polymeric poly-primary, poly-secondary, and/or poly-tertiary polyamines prepared from methyl vinyl ketone type polymers and copolymers (as disclosed in U. S. 2,063,158 and U. S. 2,122,707); polymeric beta-dimethylaminoethyl methacrylate, beta-diethylaminoethyl methacrylate as disclosed in U. S. 2,163,099; the polymeric polyprimary polyamines prepared by the reduction of acrylonitrile and substituted acrylonitrile polymers and copolymers (as disclosed in U. S. 2,456,428); poly-tertiary polyamines such as polyvinylpyridine and polymers and copolymers of vinylpyridine and substituted vinylpyridines, for instance, as disclosed in German Patent 695,098, French Patent 849,126, and in the copending application of Salisbury, Serial No. 10,909, filed February 25, 1948; polyethylene imines as disclosed in U. S. 2,182,306. While rather immobile monomeric amines such as stearylamine may be employed they do not have the combination of properties, e. g. water sensitivity, compatibility with the alpha-amino acid polyamides and the ability to reenforce (plasticize) these polyamides, which render the polymeric polyamines so desirable in the combination of this invention.

The vinylpyridine type polyamines can, of course, vary widely in molecular weight and, through the various comonomer constituents, in the degree of nitrogen content. The polymeric polyamines from the olefin/carbon monoxide polyketones and methyl vinyl ketone type polymers, as well as the hydrogenated acrylonitrile polymers and copolymers, can vary not only in molecular weight but in the proportion of amine groups in the polymer, as well as the proportion of unreacted carbonyl and cyano groups, respectively.

Because of their ready preparability, with as widely varying properties as is desired, from cheap and readily available intermediates, it is preferred to use the polymeric poly-primary, poly-secondary, and/or poly-tertiary polyamines prepared by the reductive amination of the monoolefin/carbon monoxide polyketones as disclosed in the previously mentioned copending Hoehn application. Of these reductively aminated monoolefin/carbon monoxide polyketones it is especially preferred to use those of neutral equivalent from 200–600 which are prepared from monoolefin/carbon monoxide polyketones of molecular weight from 1000 to 4000 and of combined monoolefin (preferably ethylene): carbon monoxide molar ratio from 12:1 to 1.5:1.

The methods of dyeing used in testing the dyeability of the composition of this invention are given below for each dye used. The dyeings are carried out for 60 minutes at the boil in a dye bath containing approximately 35 percent dye and diluted to approximately 1000:1, both figures based on the weight of the sample. After the dyeing period is completed, the dyed sample is removed from the dye bath and thoroughly rinsed in warm (60° C.) running water. It is then suspended in repeated changes of boiling water until no more color is leached into the water. The sample is then allowed to air dry.

*Dye A.—A blue acid dyestuff powder of Colour Index Number (CIN) 1076 having approximately an 11% color content*

The dye bath used contains one part of a solution prepared by diluting 5.96 parts of concentrated sulfuric acid with 1,000 parts of water and five parts of a solution prepared by pasting 0.3 part of the above blue dye in five parts of cold water, dissolving in 250 parts boiling water, adding three parts of sodium sulfate and diluting with 745 parts of water.

*Dye B.—A red acid dyestuff powder of CIN 430 having approximately an 80% color content.*

The dye bath used contains one part of a solution prepared by diluting 3.0 parts of glacial acetic acid with 1,000 parts of water and five parts of a solution prepared from 0.3 part of the above red dye, three parts of sodium sulfate and 1,000 parts of water in the manner described in the previous section for the blue dye.

*Dye C.—The blue dyestuff obtainable according to the procedure of Example IX of U. S. Patent 2,050,704*

The dye bath used contains five parts of a dispersion prepared by thoroughly pasting 0.3 part of the above blue dye in three parts of 10% olive-oil soap solution, dispersing the paste in 30 parts of water at 70–75° C. and diluting the resultant suspension with 967 parts of warm water. The dispersion is well shaken just prior to use.

*Dye D.—The red dyestuff described in the example in Swiss Patent 149,405*

The dye bath used is made up exactly as described immediately above using 0.3 part of the above red dye instead of Dye C.

*Dye E.—A yellow direct dyestuff powder of CIN 365*

The dye bath used contains one part of a solution prepared by dissolving 45 parts of sodium chloride and three parts of trisodium phosphate in 1,000 parts of water and five parts of a solution prepared by pasting 0.3 part of the above yellow dye in five parts of cold water, dissolving in 250 parts of boiling water, and diluting with 745 parts of water.

*Dye F.—A red direct dyestuff powder of CIN 278 having approximately a 55% color content*

The dye bath used contains one part of a solution prepared by dissolving nine parts of sodium chloride in 1,000 parts of water and five parts of a solution prepared from 0.3 part of the red direct dye and 1,000 parts of water as described above for Dye E.

*Dye G.—A green vat dyestuff paste of CIN 1101 having approximately an 11% color content*

The dye bath used contains five parts of a solution prepared by pasting 0.3 part of the above green dye in five parts of cold water, adding 0.37 part of sodium hydroxide and diluting with 995 parts of water (this dispersion should be well shaken just prior to use) and a small quantity (0.05 part) of sodium formaldehydesulfoxylate. The solution is then placed in a 100° C. bath, the sample added, and dyeing carried out for 20 minutes. One part of a solution prepared by dissolving 9.35 parts of sodium sulfate in 1,000 parts of distilled water is then added and dyeing continued for one hour. The film is then removed from the bath and allowed to air oxidize for 30 minutes prior to rinsing.

Dye H.—A blue vat dyestuff paste obtained according to German Patent 331,283 when the chlorination is carried out until a chlorine content of about 5% is obtained.

The dye procedure and dye baths used here are prepared exactly as described immediately above substituting 0.3 part of the above blue dye for 0.3 part of the green dye G and 0.05 part of sodium hydrosulfite for the 0.05 part of sodium formaldehydesulfoxylate.

The following examples in which the parts given are by weight are presented to further illustrate this invention. As used therein, inherent viscosity ($\eta_{inh.}$) is defined by the following equation:

$$\eta_{inh.} = \frac{ln \eta_{rel.}}{c}$$

wherein $ln$ is the natural, or Napierian, logarithm, $$\eta_{rel.} = \frac{\eta \text{ solution}}{\eta \text{ solvent}}$$

$\eta$ being viscosity, $c$ is the concentration of the solute in grams per 100 cc. of solution. Unless otherwise noted all inherent viscosity results are obtained with the polyamide involved dissolved in m-cresol at a concentration of 0.5 gram of polymer per 100 cc. of solution at 25° C. Intrinsic viscosity $[\eta]$, as used in these examples is defined by the following equation:

$$[\eta] = c \xrightarrow{\text{limit}} 0 \left[ \frac{ln \eta \text{ rel.}}{c} \right]$$

wherein $ln$, $c$, and $\eta_{rel.}$ are as defined above and is obtained from solutions of the polyamide involved in varying decreasing concentrations in m-cresol at 25° C.

EXAMPLE I

A mixture of nine parts of the polyamide from synthetic, optically-inactive alpha-aminoisocaproic acid of intrinsic viscosity 1.56 (prepared as described in the copending application of Cleaver and Schreiber Serial No. 71,756, filed January 19, 1949) and one part of a polymeric polyamine of molecular weight 1990 and N. E. (neutral equivalent) 190, prepared, as disclosed in the copending application of Hoehn Serial No. 4,932, filed January 28, 1948, by the reductive amination, using ammonia of an ethylene/carbon monoxide polyketone containing ethylene and carbon monoxide in a 1.5:1 combined molar ratio, is dissolved by heating and stirring in 32.3 parts of chloroform thus making a 3% solids solution. The solution is poured in a thin film onto a glass plate and the chloroform allowed to evaporate at room temperature. Upon removal from the casting surface, there is obtained a clear, strong film of the polyamide/polyamine composition. This film shows increased receptivity for dyes A, B, C, D, E, F, G, and H, particularly when dyed in dye baths containing 1.7% m-cresol, over the receptivity exhibited by film samples of the same polyamide without the added polymeric polyamine.

EXAMPLE II

A mixture of 99 parts of the same polyamide described in Example I and one part of a polymeric polyamine, exhibiting a neutral equivalent of 595 and prepared as described in Example I from an ethylene/carbon monoxide polyketone of molecular weight 1650 containing combined ethylene and carbone monoxide in a 10.9:1 molar ratio, is dissolved in 32.3 parts of chloroform by heating and stirring, thus making a 3% solids solution. The solution is poured in a thin film onto a glass plate and the chloroform allowed to evaporate at room temperature. Upon removal from the casting surface, there is obtained a clear, strong film of the 99/1 polyamide/polyamine composition.

Samples of this film exhibit an increased receptivity for dyes C, D, G, and H, particularly when dyed in dye-baths containing 1.7% m-cresol, over the receptivities exhibited by film samples of the same polyamide without the added polymeric polyamine.

EXAMPLE III

A mixture of 75 parts of the synthetic, optically-inactive polyamide from alpha-aminoisocaproic acid, of inherent viscosity 1.0 (prepared as given in Example I), and 25 parts of a polymeric polyamine exhibiting a neutral equivalent of 513 and prepared by the reductive amination, by the method of the above Hoehn application and using ammonia, of an ethylene/carbon monoxide polyketone of molecular weight 1140 containing combined ethylene and carbon monoxide in an 11.5:1 molar ratio, is dissolved in sufficient benzene by heating and stirring to make a 2.5% solids solution. The solution is poured in a thin film onto a glass plate and the benzene allowed to evaporate at room temperature. Upon removal from the casting surface, there is obtained a clear, strong film of the 75/25 polyamide/polyamine blend.

This film exhibits a tensile strength of 4508 lbs./sq. in. and 64% elongation. In comparison, a film prepared in a similar manner from another sample of the same batch of synthetic polyamide without the added polymeric polyamine exhibits a tensile strength of only 4333 lbs./sq. in. and only 8% elongation. When heated under nitrogen, another film sample of the polyamide/polyamine blend begins to decompose at 345° C.; whereas another film sample of the same batch of polyamide without the added polymeric polyamine when heated similarly begins to decompose at 315° C.

Samples of the film from the mixture containing the polymeric polyamine show increased receptivities for dyes A, B, E, F, G, and H, particularly when dyed in dye-baths containing 1.7% m-cresol, over the receptivities exhibited by film samples of the same polyamide without the added polymeric polyamine.

EXAMPLE IV

A mixture of nine parts of the polyamide described in Example I and one part of a polymeric polyamine exhibiting a neutral equivalent of 336 and prepared by the reductive amination, according to the Hoehn application and using equal parts of ammonia and dimethylamine (thereby converting about 73% of the reacting carbonyl groups into primary-amino groups and the other 27% into extralinear dimethylamino groups), of an ethylene/carbon monoxide polyketone of molecular weight 1465 containing combined ethylene and carbon monoxide in a 4:1 molar ratio, is dissolved in 32.3 parts of chloroform by heating and stirring, thus making a 3% solids solution. The solution is poured in a thin film onto a glass plate and the chloroform allowed to evaporate at room temperature. Upon removal from the casting surface, there is obtained a clear strong film of the 9/1 polyamide/polyamine mixture.

Samples of this film exhibit increased receptivities for dyes B, E, F, G, and H when dyed by the procedures given previously for the respective dyes in dye-baths containing 1.7% m-cresol over the receptivities exhibited by film samples of the same polyamide without the added polymeric polyamine. Similar dyeings carried out on additional film samples of the mixture wherein the dye-baths do not contain the added m-cresol, although less deeply dyed than those described above, nevertheless show improvements over controls without the added polyamine in receptivities for dyes A, B, C, D, and G.

EXAMPLE V

A mixture of nine parts of the same polyamide described in Example I and one part of a polymeric polyamine exhibiting a neutral equivalent of 246 and prepared by the reductive amination, according to the Hoehn method, using morpholine (thus converting all the reacting carbonyl groups into tertiary-amine groups with the amine nitrogen being the ring nitrogen of the morpholine nucleus) of an ethylene/carbon monoxide polyketone of molecular weight 1990 containing combined ethylene and carbon monoxide in a 1.5:1 molar ratio, is dissolved in 32.3 parts of chloroform by heating and stirring thus making a 3% solids solution. The solution is poured in a thin film onto a glass plate and the chloroform allowed to evaporate at room temperature. Upon removal from the casting surface there is obtained a clear, strong film of the 9/1 polyamide/polyamine composition.

Samples of this film exhibit increased receptivities for dyes B, E, G, and H when dyed by the procedures given previously for the respective dyes in dye-baths containing 1.7% m-cresol over the receptivities exhibited by film samples of the same polyamide without the added polymeric polyamine. Similar dyeings carried out on additional film samples of the mixture wherein the dye-baths do not contain the added m-cresol, although less heavily dyed than those described above, nevertheless show improvements over controls without added polyamine in receptivities for dyes C, D, and G.

EXAMPLE VI

A mixture of 500 parts of the copolyamide from a 1:1 by weight mixture of the N-carboanhydride of norleucine and alpha-aminoisobutyric acid, as disclosed in the copending application of MacDonald Serial No. 766,457, filed August 5, 1947, and 25 parts of the polymeric polyamine previously described in Example III is dissolved in a chloroform/m-cresol/benzene/methanol solvent mixture. The solution is poured in a thin film onto a glass plate and the volatile solvents allowed to evaporate at room temperature. Upon removal from the casting surface, the m-cresol is extracted with methanol and there is obtained a clear, strong film of the 20/1 polyamide/polyamine blend.

Samples of this film exhibit increased receptivities for dyes A, B, C, D, E, F, G, and H when dyed by the procedures given previously for the respective dyes in dye-baths containing 1.7% m-cresol over the receptivities exhibited by film samples of the same polyamide without the added polymeric polyamine. Similar dyeings carried out on additional film samples of the mixture wherein the dye-baths do not contain the added m-cresol, although less heavily dyed than those described above, nevertheless show improvements over controls without the added polymeric polyamine in receptivities for dyes C, D, G, and H.

EXAMPLE VII

A copolyamide is prepared from a 2:1 by weight mixture of the N-carboanhydrides of 2-amino-4,6,6-trimethylheptanoic acid and alanine as disclosed in the copending application of MacDonald Serial No. 778,459, filed October 7, 1947, and then extracted with chloroform. The chloroform-soluble fraction of this copolyamide after removal from the chloroform solution comprises about 70% of the total copolyamide and exhibits an $\eta_{inh}$ in chloroform of 2.62 at 0.5% solids concentration. Four and five-tenths (4.5) parts of this soluble fraction of the copolyamide and 0.5 part of a polymeric polyamine, prepared by the reductive amination, according to the Hoehn method, using ammonia, of a polyketone containing combined butadiene and methyl vinyl ketone in a 4:1 molar ratio (as disclosed in U. S. 2,063,158) are dissolved in 190 parts of chloroform, thus giving a 2.56% solids solution, which is poured in a thin film onto a glass plate and the chloroform allowed to evaporate at room temperature. Upon removal from the casting surface, there is obtained a clear, strong film of the 90/10 mixture of the chloroform-soluble fraction of the copolyamide and the polyamine.

Samples of this film exhibit increased receptivities for dyes A, B, C, E, F, G, and H when dyed by the procedures given previously for the respective dyes in dye-baths containing 1.7% m-cresol over the receptivities exhibited by film samples of the same polyamide without the added polymeric polyamine. Similar dyeings carried out on additional film samples of the mixture wherein the dye-baths do not contain the added m-cresol, although less heavily dyed than those described above, nevertheless show improved receptivities over controls without the added polymeric polyamine for dyes A, B, C, D, G, and H.

EXAMPLE VIII

A mixture of 45 parts of the copolyamide from a 1:1 by weight mixture of the N-carboanhydrides of DL-leucine and DL-phenylalanine exhibiting an $\eta_{inh}$ of 0.40 and 5 parts of a polymeric poly-primary amine exhibiting a neutral equivalent of 314 and prepared by the hydrogenation (at 250° C. for 10 hours at a pressure, from liquid ammonia then with hydrogen, of 600 atmospheres, over a 90/10 copper barium chromite catalyst with a total pressure drop of 15 atmospheres) of a 4/1 butadiene/acrylonitrile copolymer, is dissolved in 950 parts of chloroform. The resulting 5% solids solution is poured in a thin film onto a glass plate and the chloroform allowed to evaporate at room temperature. Upon removal from the casting surface, there is obtained a clear, strong film of the 45/5 copolyamide/copolyamine composition.

Samples of this film exhibit improved receptivities for dyes A, B, E, F, G, and H when dyed by the procedures given previously for the respective dyes in dye-baths containing 1.7% m-cresol over the receptivities exhibited by film samples of the same polyamide without the added polymeric polyamide. Similar dyeings carried out on additional film samples of the mixture wherein the dye-baths do not contain the added m-cresol, although less heavily dyed than those described above, nevertheless show improved dye receptivities over controls without the added polymeric polyamide for dyes A, B, and G.

EXAMPLE IX

A mixture of 9 parts of the same polyamide given in Example I and one part of polymeric 2-vinylpyridine of intrinsic viscosity of 2.00 in m-cresol is dissolved in 32.3 parts of chloroform by heating and stirring, thus making a 3% solids solution. The solution is poured in a thin film onto a glass plate and the chloroform allowed to evaporate at room temperature. Upon removal from the casting surface, there is obtained a clear, strong film of the 9/1 polyamide/polyvinylpyridine blend.

Samples of this film exhibit increased receptivities for dyes A, B, E, F, G, and H when dyed by the procedures given previously for the respective dyes in dye-baths containing 1.7% m-cresol over the receptivities exhibited by film samples of the same polyamide without the added polymeric polyamide. Similar dyeings carried out on additional film samples of the mixture wherein the dye-baths do not contain the added m-cresol, although less heavily dyed than those described above, nevertheless show improved receptivities over controls without the added polyamine or dyes C, D, G, and H.

EXAMPLE X

A mixture of 16.1 parts of the same alpha-aminoisocaproic acid polyamide described in Example I, 1.785 parts of the polymeric polyamine described in Example II, 697 parts of benzene and 17.885 parts of m-cresol is stirred under an atmosphere of nitrogen at 70° C. until a clear, homogeneous solution is obtained. This solution, exhibiting a viscosity of 30 poises at 60° C. by the falling ball method, is pressure-spun at the rate of 6 to 7 mls. per minute through a 20 hole (0.004 inch hole diameter) platinum-iridium spinneret into a methanol coagulating bath at 25° C. The yarn travel in the coagulating bath is 42 inches and the wind-up of the coagulated yarn on a Godet wheel is at the rate of 41 feet per minute. The yarn is taken off the Godet wheel as spun and led through a boiling water bath with a yarn travel of 57 inches and subsequently wound up at such a rate that the yarn is stretched 2.31:1 in passing through the boiling water bath and thus oriented. After boil-off, the oriented yarn exhibits a denier of 118, a dry tenacity of 0.7 gram per denier and an elongation of 14%.

Samples of this oriented yarn exhibit increased receptivities for dyes A, B, C, D, E, F, G, and H when dyed by the procedures given previously for the respective dyes in dye-baths containing 1.0% m-cresol over the respective receptivities exhibited by similar oriented yarn samples of the same polyamide without the added polymeric polyamine. Similar dyeings carried out on additional samples of the oriented polyamide/polyamine yarn wherein the dye-baths do not contain the added m-cresol, although less heavily dyed than those described above, nevertheless show improved receptivities over controls without the added polymeric polyamine for dyes B, C, and D.

Other compositions of this invention exhibiting improved dyeability for selected dyes while still maintaining or improving the good physical properties of the alpha-primary monoaminomonocarboxylic acid polyamide are listed in the following table, wherein all compositions are made up in general as described previously using a polyamide from synthetic, optically-inactive alpha-aminoisocaproic acid and the first six dyeings are carried out with 1.7% m-cresol in the dye-baths and the remaining three dyeings are without any added m-cresol. The polyamines were prepared according to the Hoehn method by the reductive amination, using ammonia, of ethylene/carbon monoxide polymers as detailed in the table.

*Table I*

| Polymeric Polyamine | | | | Superior dye receptivity over controls for dyes |
|---|---|---|---|---|
| Neutral Equivalent | Percent in Blend | Mole Weight of Polyketone from which it is prepared | Ethylene/ Carbon Monoxide mole ratio of Polyketone | |
| 513 | 10 | 1,140 | 11.5/1.0 | A, B, E, F |
| 336 | 10 | 1,790 | 5.1/1.0 | A, B, E |
| 515 | 10 | 1,650 | 10.9/1.0 | B |
| 389 | 10 | 1,280 | 8.8/1.0 | E, G |
| 513 | 15 | 1,140 | 11.5/1.0 | A, B, E, F |
| 513 | 20 | 1,140 | 11.5/1.0 | A, B, E, F |
| 389 | 10 | 1,280 | 7.8/1.0 | E |
| 513 | 15 | 1,140 | 11.5/1.0 | A, B, C, D, E |
| 513 | 20 | 1,140 | 11.5/1.0 | A, B, D, E, G |

It is noteworthy that there seems to be a cooperative relationship between the polyamide and the polyamine in connection with the increased dye receptivity since hydrophobic polymers in general are not improved in dyeability by mixing with polymeric polyamines by the methods above described for polyamides from alpha-amino acids.

The present invention is generic to compositions essentially consisting of one or more alpha-primary monoaminomonocarboxylic acid polyamides together with from 1 to 25% by weight of the composition of a polymeric polyamine having a neutral equivalent of not more than 1,000 and preferably 200-600 for best water sensitivity and dye receptivity and a molecular weight not less than 500 for sufficient immobility and reenforcing action and preferably from 1,000 to 4,000 for maximum exhibition of these properties. Because of the outstanding improvements engendered in their dyeability as well as their generally improved response to aqueous processing treatment with no lessening, and, in many instances, an actual improvement in their physical properties, the blends of this invention wherein the alpha-primary monoaminomonocarboxylic acid polyamides are hydrophobic in nature (i. e., have a water absorption when immersed in water at 25° C. of less than 5%) are particularly outstanding. Because of their easy preparation as already noted, it is preferred to use the polymeric polyamines of the above properties as prepared by the reductive amination of the monoolefin/carbon monoxide polyketones although other hydrophobic polyamines which are the reductive amination product of macromolecular aliphatic polyketones containing only carbon, hydrogen, and keto oxygen, e. g. the methyl vinyl ketone polymer reductive amination product used in Example VII may be employed.

Although all polyamides from alpha-primary monoaminomonocarboxylic acids known to me are improved in tenacity, elongation, thermal stability, response to aqueous processing treatments, and/or dyeability by this invention, it is particularly applicable to those consisting of units of alpha-primary monoaminomonocarboxylic acids which contain only carbon, hydrogen, the one amido nitrogen, and the one carbonyl oxygen, such as those prepared from one or more of the polyamide-forming derivatives (for instance, the N-carboanhydrides) of the following alpha-primary monoaminomonocarboxylic acids: alpha-primary monoaminoalkanoic acids, e. g. isoleucine, alpha-amino-n-butyric acid, alpha-methyl-alpha-amino-n-butyric acid, glycine, alpha-aminolauric acid, alpha-aminomyristic acid, 2-amino-4,6,6-trimethylheptanoic acid, valine, norvaline, alpha-aminodiethylacetic acid, alpha-amino-alpha, gamma-dimethylvaleric acid; cycloaliphatic-alpha-primary monoaminomonocarboxylic acids, e. g. 1-aminocyclopentanecarboxylic acid, 1-aminocyclohexanecarboxylic acid, 1-amino-cycloheptanecarboxylic acid.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A composition consisting essentially of a blended mixture of a hydrophobic alpha-primary monoaminomonocarboxylic acid polyamide composed of monoaminomonocarboxylic acid units containing only carbon, hydrogen, the one amido nitrogen, and the one carbonyl oxygen, of intrinsic viscosity, in polar solvents, of at least 0.4, and having a water absorption at 100% relative humidity at 25° C. of less than 5% with from 1 to 25%, by weight of the mixture, of a hydrophobic polymeric polyamine of molecular weight of 1000–4000 and neutral equivalent of 200–1000, said polyamine being a product of the reductive amination of a macromolecular aliphatic polyketone containing only carbon, hydrogen, and keto oxygen.

2. A composition consisting essentially of a blended mixture of a hydrophobic alpha-primary monoaminomonocarboxylic acid polyamide of intrinsic viscosity, in polar solvents, of at least 0.4, having a water absorption, at 100% relative humidity, of less than 5%, and being composed of monoaminomonocarboxylic acid units containing only carbon, hydrogen, the one amido nitrogen, and the one carbonyl oxygen, with from 1 to 25%, by weight of the composition, of a hydrophobic polymeric polyamine product of the reductive amination of a monoolefin/carbon monoxide copolymer, said polymeric polyamine having a molecular weight within the 1000–4000 range and a neutral equivalent of 200–1000 and being derived from a monoolefin/carbon monoxide copolymer polyketone of molecular weight of 1000–4000 and of combined olefin: carbon monoxide ratio of from 12:1 to 1.5:1.

3. A composition consisting essentially of a blended mixture of a hydrophobic alpha-primary monoaminomonocarboxylic acid polyamide of intrinsic viscosity, in polar solvents, of at least 0.4, having a water absorption, at 100% relative humidity, of less than 5%, and being composed of monoaminomonocarboxylic acid units containing only carbon, hydrogen, the one amido nitrogen, and the one carbonyl oxygen, with from 1 to 25%, by weight of the composition, of a hydrophobic polymeric polyamine product of the reductive amination of a monoolefin/carbon monoxide copolymer, said polymeric polyamine having a molecular weight within the 1000–4000 range and a neutral equivalent of 200–600 and being derived from a monoolefin/carbon monoxide copolymer polyketone of molecular weight of 1000–4000 and of combined olefin: carbon monoxide ratio of from 12:1 to 1.5:1.

4. A composition consisting essentially of a blended mixture of a hydrophobic alpha-primary monoaminomonocarboxylic acid polyamide of intrinsic viscosity, in polar solvents, of at least 0.4, having a water absorption, at 100% relative humidity, of less than 5%, and being composed of monoaminomonocarboxylic acid units containing only carbon, hydrogen, the one amido nitrogen, and the one carbonyl oxygen, with from 1 to 25%, by weight of the composition, of a hydrophobic polymeric polyamine product of the reductive amination of an ethylene/carbon monoxide copolymer, said polymeric polyamine having a molecular weight within the 1000–4000 range and a neutral equivalent of 200–600 and being derived from an ethylene/carbon monoxide copolymer polyketone of molecular weight of 1000–4000 and of combined ethylene: carbon monoxide ratio of from 12:1 to 1.5:1.

5. A film of the blended composition of claim 1.

6. An oriented filament of the blended composition of claim 1.

7. A composition consisting essentially of a blended mixture of three parts of poly-alpha-aminoisocaproic acid of inherent viscosity of 1.0 and one part of a hydrophobic polymeric polyamine product, of neutral equivalent of 513, of the reductive amination of an ethylene/carbon monoxide copolymer polyketone of molecular weight about 1140 and of combined ethylene: carbon monoxide molar ratio of 11.5:1

8. A composition according to claim 1 wherein the polyamine component has a neutral equivalent of 200–600.

9. A dyed oriented filament of the blended composition of claim 1.

10. An oriented filament of the blended composition of claim 1, dyed with an acid dye.

11. A composition consisting essentially of a blended mixture of a hydrophobic alpha-primary monoaminomonocarboxylic acid polyamide of intrinsic viscosity, in polar solvents, of at least 0.4, having a water absorption, at 100% relative humidity, of less than 5%, and being composed of monoaminomonocarboxylic acid units containing only carbon, hydrogen, the one amido nitrogen, and the one carbonyl oxygen, with from 1 to 25%, by weight of the composition, of a hydrophobic polymeric polyamine product of the reductive amination of a methyl vinyl ketone polymer, containing only carbon, hydrogen, and keto oxygen, of molecular weight of 1000–4000, said polymeric polyamine having a neutral equivalent of 200–1000.

BOYNTON GRAHAM.

References Cited in the file of this patent

UNITED STATES PATENTS

| Number | Name | Date |
|---|---|---|
| 2,071,253 | Carothers | Feb. 16, 1937 |
| 2,168,336 | Heckert | Aug. 8, 1939 |
| 2,495,255 | Hoehn | Jan. 24, 1950 |
| 2,527,863 | Webb | Oct. 31, 1950 |

FOREIGN PATENTS

| Number | Country | Date |
|---|---|---|
| 502,861 | Great Britain | Mar. 22, 1939 |
| 613,817 | Great Britain | Dec. 3, 1948 |
| 614,063 | Great Britain | Dec. 8, 1948 |

OTHER REFERENCES

Chemical & Engineering News, June 30, 1947, p. 1888.